United States Patent
Adachi

(10) Patent No.: US 9,363,726 B2
(45) Date of Patent: Jun. 7, 2016

(54) MOBILITY OF LIPA CONNECTION FROM HOME BASE STATION

(75) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 96 days.

(21) Appl. No.: 14/129,888

(22) PCT Filed: Jun. 28, 2011

(86) PCT No.: PCT/JP2011/064839
§ 371 (c)(1),
(2), (4) Date: Dec. 27, 2013

(87) PCT Pub. No.: WO2013/001611
PCT Pub. Date: Jan. 3, 2013

(65) Prior Publication Data
US 2014/0126539 A1    May 8, 2014

(51) Int. Cl.
| | | |
|---|---|---|
| H04W 36/18 | (2009.01) | |
| H04W 36/08 | (2009.01) | |
| H04W 36/00 | (2009.01) | |
| H04W 84/04 | (2009.01) | |
| H04W 84/12 | (2009.01) | |
| H04W 8/08 | (2009.01) | |
| H04W 80/04 | (2009.01) | |

(52) U.S. Cl.
CPC .......... *H04W 36/18* (2013.01); *H04W 36/0016* (2013.01); *H04W 36/08* (2013.01); *H04W 8/082* (2013.01); *H04W 80/04* (2013.01); *H04W 84/045* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2010/0272013 A1* | 10/2010 | Horn et al. | 370/328 |
| 2012/0170512 A1* | 7/2012 | Gleixner | H04L 61/2514 370/328 |
| 2012/0189016 A1 | 7/2012 | Bakker et al. | |
| 2012/0196600 A1 | 8/2012 | Mizukoshi | |
| 2012/0244445 A1* | 9/2012 | Han et al. | 429/338 |
| 2013/0301610 A1* | 11/2013 | Ali | H04W 36/08 370/331 |
| 2013/0337812 A1* | 12/2013 | Pekonen | H04W 76/062 455/436 |
| 2014/0023042 A1* | 1/2014 | Westberg | 370/331 |

FOREIGN PATENT DOCUMENTS

| | | |
|---|---|---|
| WO | 2011/026407 A1 | 3/2011 |
| WO | 2011/045882 A1 | 4/2011 |
| WO | 2012/100199 A3 | 9/2012 |

OTHER PUBLICATIONS

International Search Report; PCT/JP2011/064838; Aug. 9, 2011.
(Continued)

*Primary Examiner* — Ian N Moore
*Assistant Examiner* — Latresa McCallum
(74) *Attorney, Agent, or Firm* — Studebaker & Brackett PC

(57) ABSTRACT

An HeNB (200-1) that supports LIPA defined in the 3GPP (3rd Generation Partnership Project) standards: transmits (step S103) a handover request to a target HeNB (200-2) when a handover procedure from the HeNB (200-1) to the HeNB (200-2) is started for a UE (100) having an LIPA connection; receives (step S104) an acknowledgement for the handover request, the acknowledgement being transmitted from the HeNB (200-2); and continues (step S106, S107) the handover procedure without releasing the LIPA connection, when the acknowledgement from the HeNB (200-2) includes information indicating that the LIPA is supported.

6 Claims, 5 Drawing Sheets

(56) References Cited

OTHER PUBLICATIONS

3GPP TS 22.220 V9.6.0 (Mar. 2011), 3rd Generation Partnership Project; Technical Specification Group Services and System Aspects; Service requirements for Home Node B (HNB) and Home eNode B (HeNB) (Release 9), pp. 1-22.
3GPP TS 23.401 V10.3.0 (Mar. 2011), 3rd Generation Partnership Project; Technical Specification Group Services and System Aspects; General Packet Radio Service (GPRS) enhancements for Evolved Universal Terrestrial Radio Access Network (E-UTRAN) access (Release 10); pp. 1-278.
3GPP TR 23.829 V10.0.0 (Mar. 2011), 3rd Generation Partnership Project; Technical Specification Group Services and System Aspects; Local IP Access and Selected IP Traffic Offload (LIPA-SIPTO) (Release 10), pp. 1-43.
3GPP TS 36.300 V10.3.0 (Mar. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), pp. 1-197.
An Office Action issued by the Korean Patent Office on Feb. 10, 2015, which corresponds to Korean Patent Application No. 10-2013-7034194 and is related to U.S. Appl. No. 14/129,888; with English language concise explanation.
CATT; "Discussion of LGW Deployment in Local Network"; 3GPP TSG SA WG2 Meeting #84; TD S2-111814; Apr. 11-15, 2011; pp. 1-3; Bratislava, Slovakia.
An Office Action; "Notice of Reasons for Rejection," issued by the Japanese Patent Office on Aug. 26, 2014, which corresponds to Japanese Patent Application No. 2013-522395 and is related to U.S. Appl. No. 14/129,888; with English language statement of relevance.
Huawei et al.; "Discovery of the LIPA mobility area"; 3GPP TSG SA WG2 Meeting #85; May 16-20, 2011; pp. 1-4; TD S2-112828 (revision of S2-112783); Xi'an, China.
The extended European search report issued by the European Patent Office on Apr. 16, 2015, which corresponds to European Patent Application No. 11868830.8-1854 and is related to U.S. Appl. No. 14/129,888.
Communication pursuant to Rules 70(2) and 70a(2) EPC issued by the European Patent Office on May 7, 2015, which corresponds to European Patent Application No. 11868830.8-1854 and is related to U.S. Appl. No. 14/129,888.
Zte; "LIPA mobility based on direct X2/Iurh"; 3GPP Draft; SA WG2 Meeting #85; S2-112321 (revision of S2-111349); May 16-20, 2011; pp. 1-2; Xi'An, P.R. China.

* cited by examiner

MOBILITY OF LIPA CONNECTION FROM HOME BASE STATION

TECHNICAL FIELD

The present invention relates to a communication control method and a home base station in a mobile communication system.

BACKGROUND ART

In 3GPP (3rd Generation Partnership Project) which is a project aiming to standardize a mobile communication system, the standardization of LTE Advanced, which is a sophisticated version of LTE (Long Term Evolution), is conducted after 3GPP Release 10.

In the 3GPP Release 10, an LIPA (Local Internet Protocol Access) function by a home base station is defined (see NPLs 1 and 2). The home base station is a small-sized base station provided in a house or in a company and may be called a femto cell base station.

LIPA is a function of performing communication by an LIPA connection (LIPA PDN connection) which is established between a user terminal and a local device within an IP network of the house (or company) where the user terminal is located, via a home base station and not via a core network of an operator. The LIPA does not feed user data to the core network, and thus, it is possible to reduce a traffic load of the core network.

The 3GPP Release 10 does not support a mobility of the LIPA connection. Therefore, when a user terminal having the LIPA connection moves from a home base station to another base station, the connection is always released. As a result, when resuming communication between the user terminal and the local device to which the user terminal had been connected, a reconnection process is needed, and thus, the communication is interrupted.

CITATION LIST

Non Patent Literature

[NPL 1] 3GPP Technical Specification TS 23.401 V10.3.0, "4.3.16 Local IP Access (LIPA) function"
[NPL 2] 3GPP Technical Specification TS 36.300 V10.3.0, "4.6.5 Support of LIPA with HeNB"

SUMMARY OF THE INVENTION

Release 11, of which the specification will be developed in the future following the 3GPP Release 10, is expected to support the mobility of the LIPA connection between the home base stations that support the LIPA, that is, enable handover while maintaining the LIPA connection.

However, the current specification defines that when the user terminal having the LIPA connection moves from the home base station to another base station, the LIPA connection is always released, and thus, there is a problem that it is not possible to support the mobility of the LIPA connection.

Therefore, it is an object of the present invention to provide a communication control method capable of supporting a mobility of an LIPA connection and to provide a home base station thereof.

The first feature of a communication control method according to the present invention is summarized as follows. A communication control method in a home base station (source HeNB 200-1) that supports LIPA (Local Internet Protocol Access) defined in the 3GPP (3rd Generation Partnership Project) standards, comprises: a step (step S103) of transmitting a handover request to a target base station when a handover procedure from the home base station to the target base station is started for a user terminal (UE 100) having an LIPA connection; a step (step S104) of receiving an acknowledgement for the handover request, the acknowledgement being transmitted from the target base station; and a step (steps S106, S107) of continuing the handover procedure without releasing the LIPA connection, when the acknowledgement from the target base station includes information indicating that the LIPA is supported.

The first feature of a home base station according to the present invention is summarized as follows. A home base station (source HeNB 200-1) that supports LIPA (Local Internet Protocol Access) defined in the 3GPP (3rd Generation Partnership Project) standards, is configured to: transmit a handover request to a target base station when a handover procedure from the home base station to the target base station is started for a user terminal (UE 100) having an LIPA connection; receive an acknowledgement for the handover request, the acknowledgement being transmitted from the target base station; and continue the handover procedure without releasing the LIPA connection, when the acknowledgement from the target base station includes information indicating that the LIPA is supported.

The second feature of a communication control method according to the present invention is summarized as follows. A communication control method in a home base station (target HeNB 200-2), comprises: a step (step S103) of receiving a handover request transmitted from another home base station (source HeNB 200-1) that supports LIPA (Local Internet Protocol Access) defined in the 3GPP (3rd Generation Partnership Project) standards; and a step (step S104) of transmitting information indicating whether or not the LIPA is supported by the home base station, to the another home base station, by including the information in an acknowledgement for the handover request.

The second feature of a c home base station according to the present invention is summarized as follows. A home base station (target HeNB 200-2) is configured to: receive a handover request transmitted from another home base station (source HeNB 200-1) that supports LIPA (Local Internet Protocol Access) defined in the 3GPP (3rd Generation Partnership Project) standards; and transmit information indicating whether or not the LIPA is supported by the home base station, to the another home base station, by including the information in an acknowledgement for the handover request.

DESCRIPTION OF THE EMBODIMENT

Figure 1:
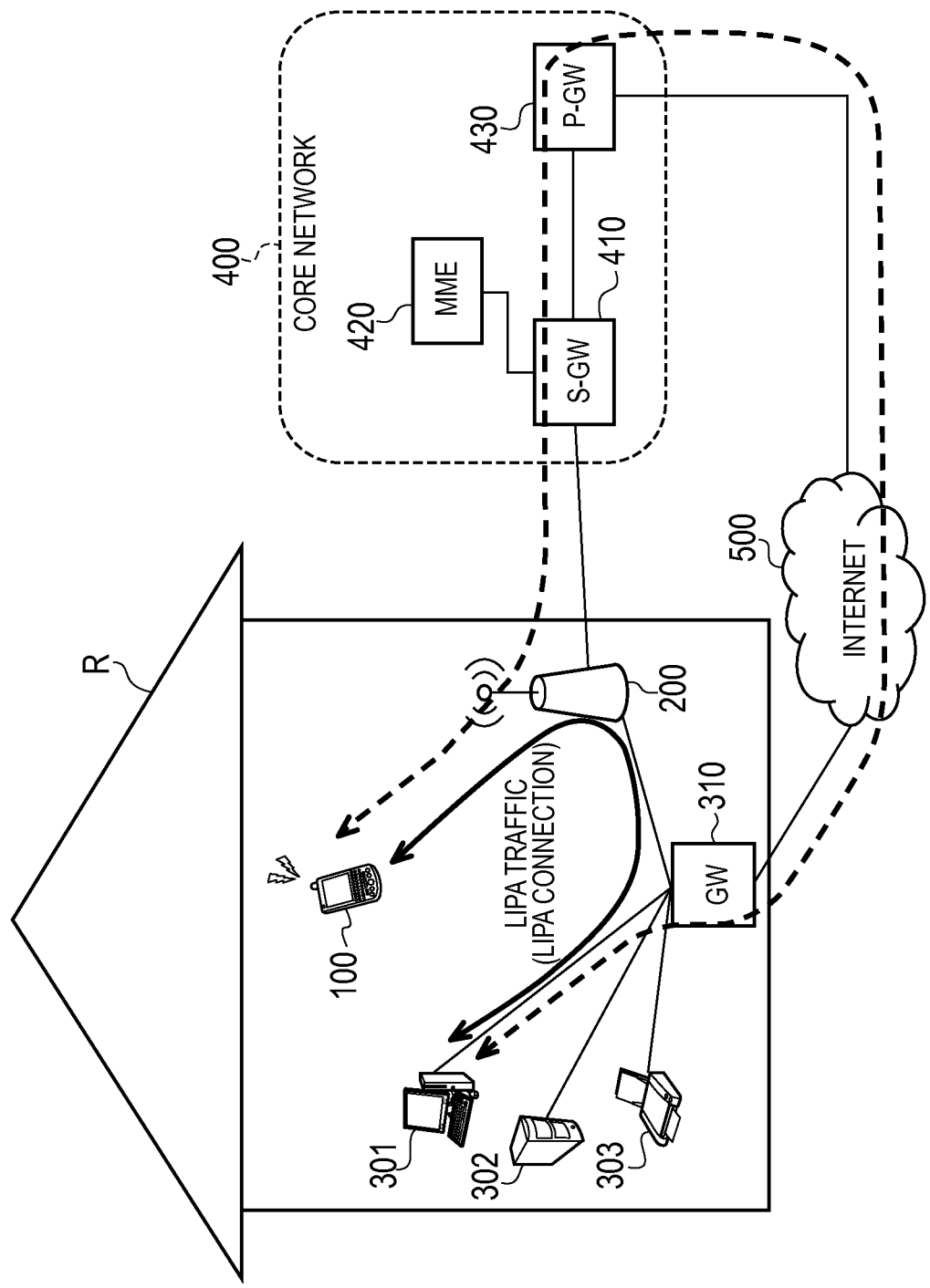
FIG. 1 is a diagram showing an entire configuration of a mobile communication system according to the embodiment of the present invention.

With reference to the drawings, the embodiment of the present invention will be described. In the drawings of the following embodiments, the same or similar reference signs are applied to the same or similar portions.

(Configuration of Mobile Communication System)

FIG. 1 is a diagram showing an entire configuration of a mobile communication system according to the present embodiment. The mobile communication system according to the present embodiment is configured on the basis of LTE-Advanced (after 3GPP Release 10) of which the specification is developed in 3GPP.

As shown in FIG. 1, the mobile communication system according to the present embodiment includes a home base station (Home evolved Node B: HeNB) 200, a user terminal (User Equipment: UE) 100, local devices (Local Entities: LEs) 301 to 303, and a gateway (GW) 310. In the present embodiment, each of the HeNB 200, the UE 100, the LEs 301 to 303, and the GW 310 is located on an IP network in the same house R.

The HeNB 200 forms a small-sized cell, and performs radio communication with the UE 100 located within the cell. The cell is a minimum unit of a radio communication area.

In the HeNB 200, a function of a local gateway (L-GW) for implementing LIPA is provided. The LIPA is a function that enables the IP-compatible UE 100 connected via the HeNB 200 to access another IP-compatible entity within an IP network of the same house/company without a user plane crossing an operator network (core network 400) other than an HeNB subsystem.

The HeNB 200 (more particularly, L-GW provided in the HeNB 200) establishes or releases the LIPA connection. A solid arrow in FIG. 1 represents user data transmitted via the LIPA connection between the UE 100 and the LE 301. Whereas, a dotted arrow in FIG. 1 represents user data transmitted via the core network 400 when the LIPA is not implemented. When the LIPA is implemented, the user data will be transmitted not via the core network 400, and thus, it is possible to reduce a traffic load of the core network 400.

The UE 100 is a portable radio communication device carried by a user, and is configured to be capable of IP communication. In the present embodiment, the UE 100 includes an LIPA connection via the HeNB 200, between with the LE 301. The UE 100 communicates with the LE 301 by using the LIPA connection.

Each of the LEs 301 to 303 is a device capable of IP communication. In the present embodiment, the LE 301 is a PC (Personal Computer), the LE 302 is a server, and the LE 303 is a printer.

The GW 310 relays data transmitted and received within the IP network in the house R, and performs a protocol conversion between the IP Network within the house R and an Internet 500.

The core network 400 includes a serving gateway (S-GW) 410, a mobility management entity (MME) 420, and a PDN gateway (P-GW) 430.

The S-GW 410 is provided to correspond to a user plane, and is configured to perform transfer control on the user data.

The MME 420 is provided to correspond to a control plane, and is configured to perform various types of mobility managements on the UE 100.

A transmission path between the HeNB 200 and the S-GW 410/MME 420 is called an S1 interface. It is noted that an inter-base station transmission path between the HeNB 200 and another HeNB is called an X2 interface.

The P-GW 430 functions as an entrance from the core network 400 to the Internet 500, and an exit from the Internet 500 to the core network 400.

It is noted that although not shown in FIG. 1, an HeNB gateway (HeNB GW) that houses a plurality of HeNBs 200 may be provided between the HeNB 200 and the S-GW 410/MME 420.

(Configuration of UE)

Figure 2:
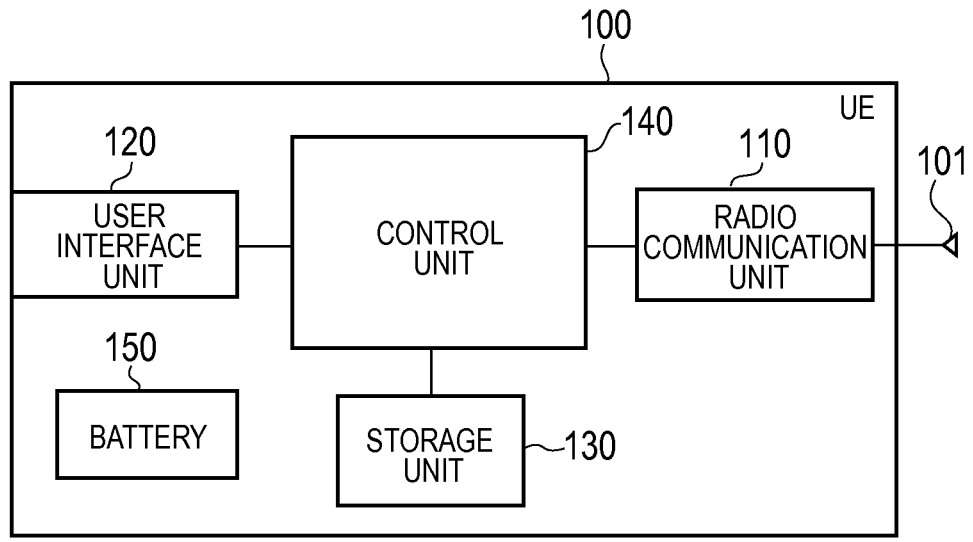
FIG. 2 is a block diagram of the user equipment according to the embodiment of the present invention.

Next, the configuration of the UE 100 according to the present embodiment will be described. FIG. 2 is a block diagram of the UE 100.

As shown in FIG. 2, the UE 100 includes an antenna 101, a radio communication unit 110, a user interface unit 120, a storage unit 130, a control unit 140, and a battery 150.

The radio communication unit 110 is configured to perform radio communication via the antenna 101. For transmission, the radio communication unit 110 performs up-conversion, amplification, etc., on a baseband signal input from the control unit 140, and outputs a radio signal from the antenna 101. For reception, the radio communication unit 110 performs amplification, down-conversion, etc. on a received signal input from the antenna 101, and then outputs a baseband signal to the control unit 140.

The user interface unit 120 includes a microphone to which voice is input, a speaker that outputs voice, a display that displays an image, and a button pressed by a user, for example.

The storage unit 130 is configured by using a memory, for example, and stores various types of information used for control, for example, by the control unit 140.

The control unit 140 is configured by using a CPU, for example, and controls various types of functions provided in the UE 100.

The battery 150 stores power to be supplied to each block of the UE 100.

In the UE 100 thus configured, when the control unit 140 is in a state of being executing communication (called a connected mode), the control unit 140 measures a reception state (reference signal received power or reference signal received quality) of a reference signal received by the radio communication unit 110 for each cell, and controls so that a measurement result for each cell is reported to the serving base station.

Such a report is called measurement report. The serving base station decides whether to perform handover of the UE 100 on the basis of the measurement report. The handover is an operation that the UE 100 in a connected mode switches the serving cells. It is noted that the measurement report has two settings, i.e., a setting (Periodic) that is periodically transmitted and a setting (Event trigger) that is not transmitted until a trigger condition for permitting handover is satisfied.

(Configuration of HeNB)

Figure 3:
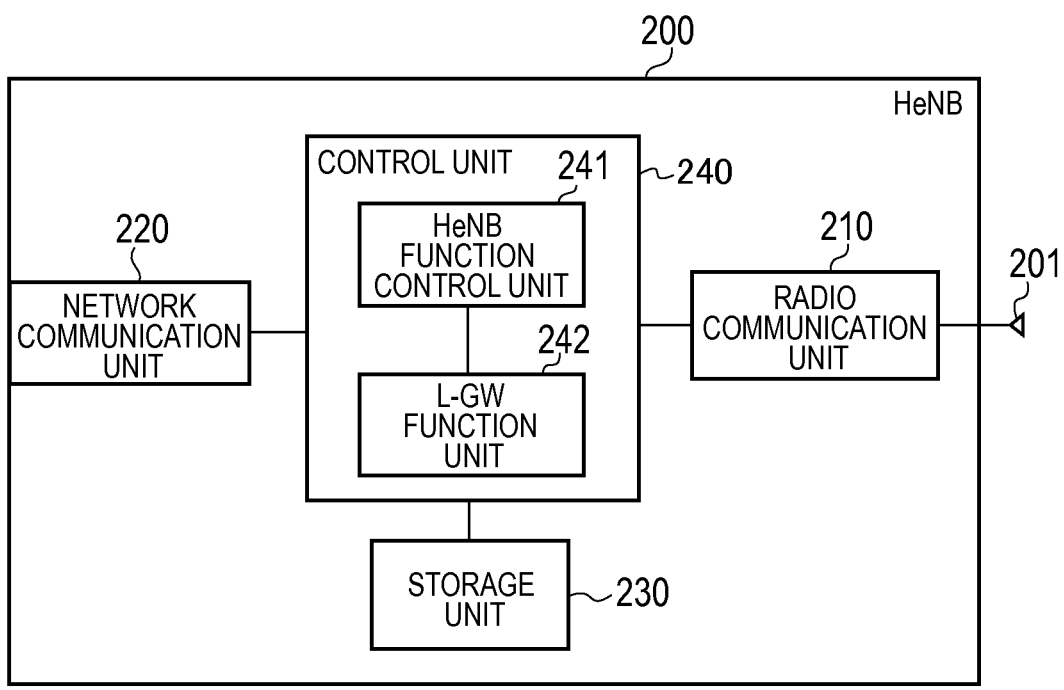
FIG. 3 is a block diagram of the home base station according to the embodiment of the present invention.

Next, the configuration of the HeNB 200 according to the present embodiment will be described. FIG. 3 is a block diagram of the HeNB 200.

As illustrated in FIG. 3, the HeNB 200 includes an antenna 201, a radio communication unit 210, a network communication unit 220, a storage unit 230, and a control unit 240.

The radio communication unit 210 is configured to perform radio communication through the antenna 201. For transmission, the radio communication unit 210, performs up-conversion, amplification, etc., on a baseband signal input from the control unit 240, and outputs a radio signal from the antenna 201. For reception, the radio communication unit 210 performs, amplification, down-conversion, etc., on a received signal input from the antenna 201, and then outputs a baseband signal to the control unit 240.

The network communication unit 220 uses the S1 interface to communicate with the S-GW 410, the MME 420, or the HeNB GW. Furthermore, the network communication unit 220 performs communication (inter-base station communication) with another HeNB by using the X2 interface. Further, the network communication unit 220 communicates with the LEs 301 to 303 via the GW 310 in the house R.

The storage unit 230 is configured by using a memory, for example, and stores various types of information used for control, for example, by the control unit 240.

The control unit 240 is configured by using a CPU, for example, and controls various functions provided in the HeNB 200. The control unit 240 includes an HeNB function control unit 241 for controlling an original function of the HeNB and an L-GW function unit 242 for implementing the function of the L-GW. It is noted that when the LIPA is not supported, the HeNB 200 does not include the L-GW function unit 242.

The HeNB function control unit 241 controls radio communication with the UE 100 and controls network communication using the S1 interface and the X2 interface. Further, the HeNB function control unit 241 decides whether to perform handover of the UE 100 to a target base station on the basis of the measurement report received by the radio communication unit 210 from the UE 100. The HeNB function control unit 241 starts a handover procedure when it is decided to perform handover. It is noted that the handover procedure includes a handover preparation stage, a handover execution state, and a handover completion stage.

The L-GW function unit 242 performs various types of controls for implementing the LIPA, for example, establishes or releases the LIPA connection. As described later, the L-GW function unit 242 is controlled by Intra-node Signaling from the HeNB function control unit 241.

In the HeNB 200 thus configured, the HeNB function control unit 241 controls the network communication unit 220 so that a handover request is transmitted to the target base station when starting a handover procedure, for the UE 100 having the LIPA connection, from the HeNB 200 (self station) to the target base station. The network communication unit 220 receives an acknowledgement or a negative acknowledgement, which is transmitted from the target base station, for the handover request. The HeNB function control unit 241 continues the handover procedure without releasing the LIPA connection, when the acknowledgement (handover request acknowledgement) from the target base station includes information indicating that the LIPA is supported. However, when the acknowledgement from the target base station does not include information indicating that the LIPA is supported or when the negative acknowledgement from the target base station is received, the HeNB function control unit 241 requests the L-GW function unit 242 to release the LIPA connection by using the Intra-node Signaling.

On the other hand, when the HeNB 200 is to receive the handover request, the network communication unit 220 receives the handover request. The HeNB function control unit 241 determines whether or not to permit the handover request, and when the handover request is permitted, whether or not the HeNB 200 (self station) supports the LIPA (that is, whether or not the L-GW function unit 242 is provided) is confirmed. Then, the HeNB function control unit 241 controls the network communication unit 220 so that the acknowledgement including the information indicating whether or not the HeNB 200 (self station) supports the LIPA is returned.

(Operation of Mobile Communication System)

Next, by using FIG. 4 and FIG. 5, the operation of the mobile communication system according to the present embodiment will be described.

Figure 4:
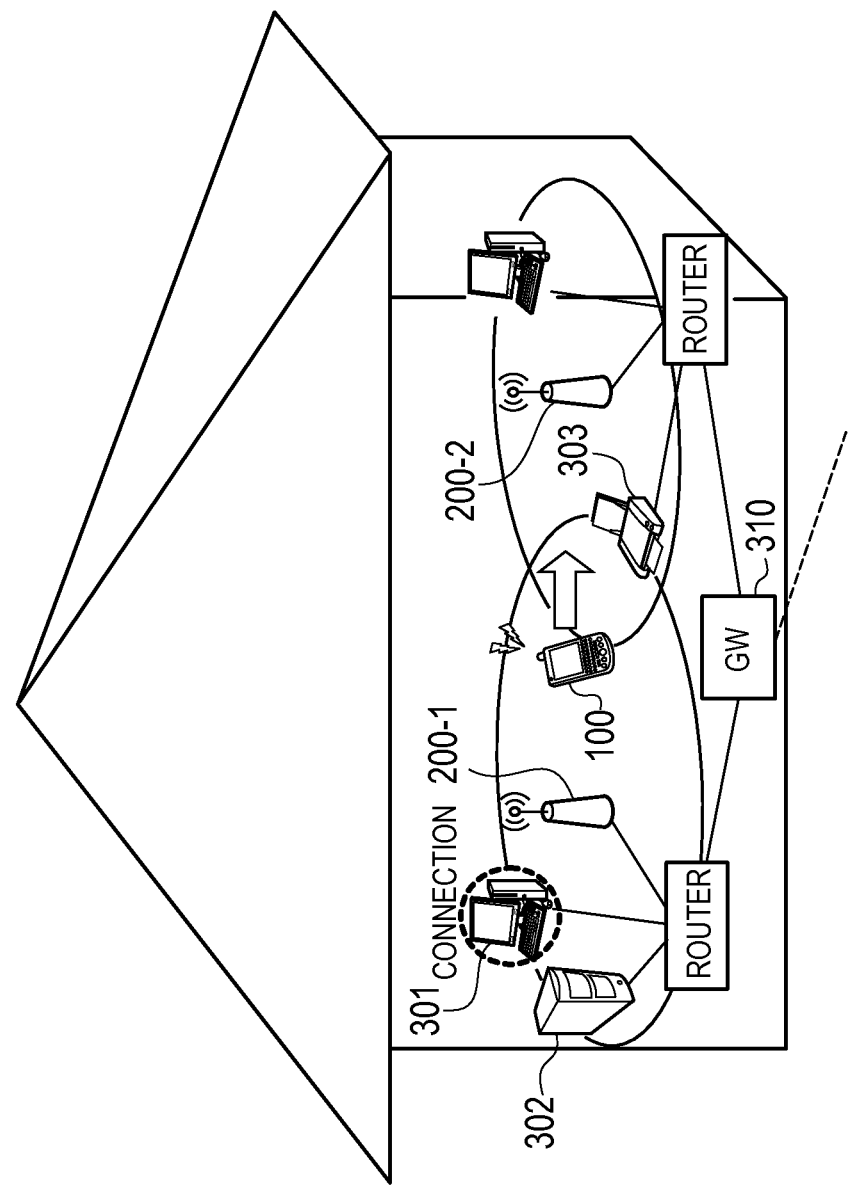
FIG. 4 is a diagram for describing operation of the home base station according to the embodiment of the present invention.

As shown in FIG. 4, the UE 100 positioned in the communication area of HeNB 200-1 moves in the communication area of HeNB 200-2 while establishing the LIPA connection with the LE 301 via the HeNB 200-1. An operation sequence described later is an operation of the mobile communication system when the HeNB 200-1 that supports the LIPA is a source (handover source) and the HeNB 200-2 is a target (handover target).

Figure 5:
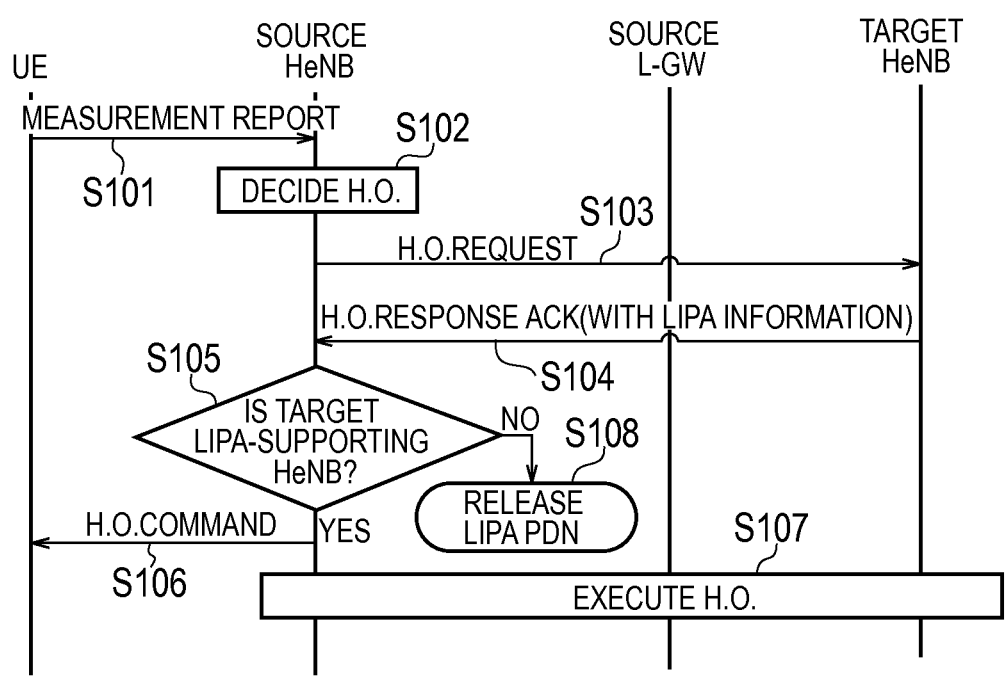
FIG. 5 is an operation sequence diagram of the mobile communication system according to the embodiment of the present invention.

FIG. 5 is an operation sequence diagram of the mobile communication system according to the present embodiment. In this case, an operation when the target HeNB 200-2 permits the handover request will be described.

As shown in FIG. 5, in step S101, the radio communication unit 210 of the source HeNB 200-1 receives a measurement report from the UE 100. The measurement report includes a cell ID of the HeNB 200-2 and a measurement result of the cell.

In step S102, the HeNB function control unit 241 of the source HeNB 200-1 decides to start the handover procedure of the UE 100 to the target HeNB 200-2, on the basis of the cell ID of the target HeNB 200-2 included in the measurement report received from the UE 100 in step S101.

In step S103, the HeNB function control unit 241 of the source HeNB 200-1 controls the network communication unit 220 so that the handover request (H.O. Request) is transmitted to the target HeNB 200-2. In this case, the handover request is transmitted on an X2 interface when the X2 interface is present between the source HeNB 200-1 and the target HeNB 200-2, and transmitted on an S1 interface when the X2 interface is not present. As a result of the handover request being transmitted, the preparation stage of the handover is started.

When the network communication unit 220 of the target HeNB 200-2 receives the handover request from the source HeNB 200-1, the HeNB function control unit 241 of the target HeNB 200-2 confirms whether or not the target HeNB 200-2 (self station) supports the LIPA.

In step S104, the HeNB function control unit 241 of the target HeNB 200-2 controls the network communication unit 220 so that the information indicating whether or not the LIPA is supported by the target HeNB 200-2 (self station) is included in the acknowledgement (H.O. Response ACK) for the handover request received in step S103 and transmitted to the source HeNB 200-1. In this case, when the acknowledgement (H.O. Response ACK) is transmitted on an X2 interface when the X2 interface is present between the source HeNB 200-1 and the target HeNB 200-2, and transmitted on an S1 interface when the X2 interface is not present.

The network communication unit 220 of the source HeNB 200-1 receives the acknowledgement from the target HeNB 200-2.

In step S105, the HeNB function control unit 241 of the source HeNB 200-1 confirms whether or not the information indicating that the target HeNB 200-2 supports the LIPA is included in the acknowledgement that is transmitted from the target HeNB 200-2 and that is received by the network communication unit 220. When the information indicating that the target HeNB 200-2 supports the LIPA is included, the HeNB function control unit 241 advances the process to step S106. On the other hand, when the information indicating that the target HeNB 200-2 supports the LIPA is not included, the HeNB function control unit 241 advances the process to step S108.

In step S106, the HeNB function control unit 241 of the source HeNB 200-1 controls the radio communication unit 210 so as to transmit a handover command to the UE 100. As a result, the execution stage of the handover is started. The handover command includes information for the UE 100 to access the target HeNB 200-2.

The radio communication unit 110 of the UE 100 receives the handover command from the source HeNB 200-1. The control unit 140 of the UE 100 starts accessing the target HeNB 200-2 in response to the radio communication unit 110 having received the handover command from the source HeNB 200-1.

In step S107, the source HeNB 200-1 and the target HeNB 200-2 executes the execution stage and the completion stage of the handover. Upon completion of the handover procedure in this way, the UE 100 is capable of switching the serving cell (serving base station) to the target HeNB 200-2 in a state where the LIPA connection is maintained.

On the other hand, in step S108, the HeNB function control unit 241 of the source HeNB 200-1 cancels the handover procedure. Further, the HeNB function control unit 241 of the source HeNB 200-1 uses Intra-node Signaling to request the L-GW function unit 242 of the source HeNB 200-1 to release the LIPA connection. The L-GW function unit 242 of the source HeNB 200-1 releases the LIPA connection of the UE 100 in response to the request from the HeNB function control unit 241 of the source HeNB 200-1. Then, the HeNB function control unit 241 of the source HeNB 200-1 disconnects the connection between the source HeNB 200-1 and the UE 100. As a result, the control unit 140 of the UE 100 accesses the target HeNB 200-2 to perform reconnection with the LE 301.

(3) Specific Example of Handover Request Acknowledgement

Next, by using Table 1, a specific example of a handover request acknowledgement according to the present embodiment will be described. Portions indicated by an underline in Table 1 are newly added information elements (IEs). Contents other than the positions indicated by the underline are the same as those defined in 9.1.1.2 HANDOVER REQUEST ACKNOWLEDGE of 3GPP TS 36.423 V10.1.0.

As shown in Table 1, the handover request acknowledgement according to the present embodiment includes LIPA Support Indication IE indicating whether or not the LIPA is supported.

The LIPA Support Indication IE can be configured to be 1-bit flag such that when the LIPA is supported by a transmission source (self station) of the message, the IE is "1", and when the LIPA is not supported, the IE is "0".

(Effect of the Embodiment)

As described above, the source HeNB 200-1 that supports the LIPA transmits the handover request to the target base station when starting a handover procedure, for the UE 100 having the LIPA connection, from the source HeNB 200-1 to the target base station.

The target HeNB 200-1 transmits the information indicating whether or not the LIPA is supported by the target HeNB 200-1 (self station), to the source HeNB 200-1, by including the information in the acknowledgement for the handover request.

Then, the source HeNB 200-1 continues the handover procedure without releasing the LIPA connection when the acknowledgement including the information indicating that the LIPA is supported by the target HeNB 200-1 is received.

As a result, the source HeNB 200-1 can know that the LIPA is supported by the target base station through a process of the handover procedure, even when HeNB 200-1 does not know in advance whether or not the LIPA is supported by the target base station. Therefore, the HeNB 200-1 can perform handover while maintaining the LIPA connection.

(Other Embodiment)

As described above, the present invention was described according to the embodiment. However, it must not be understood that the discussions and drawings constituting a part of this disclosure limit the present invention. From this disclosure, various alternative embodiments, examples and operational techniques are apparent to those skilled in the art.

An access type such as "closed" in which only an access by a specific UE is permitted and "open" in which an access by

TABLE 1

HANDOVER REQUEST ACKNOWLEDGE message

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| E-RABs Admitted List | | 1 | | | YES | ignore |
| >E-RABs Admitted Item | | 1 to <maxnoof Bearers> | | | EACH | ignore |
| >>E-RAB ID | M | | 9.2.23 | | — | — |
| >>UL GTP Tunnel Endpoint | O | | GTP Tunnel Endpoint 9.2.1 | Identifies the X2 transport bearer used for forwarding of UL PDUs | — | — |
| >>DL GTP Tunnel Endpoint | O | | GTP Tunnel Endpoint 9.2.1 | Identifies the X2 transport bearer used for forwarding of DL PDUs | — | — |
| E-RABs Not Admitted List | O | | E-RAB List 9.2.28 | a value for E-RAB ID shall only be present once in E-RABs Not Admitted List IE + in E-RABs Not Admitted List IE | YES | ignore |
| Target eNB To Source eNB Transport Container | M | | OCTET STRING | Includes the RRC E-UTRA Handover Command message as defined in subclause 10.2.2 in TS 36.332 [9]. | YES | ignore |
| Criticality Diagnostics | O | | 9.2.7 | | YES | ignore |
| LIPA Support Indication | O | | | | | | another UE also is permitted, may be set to the HeNB. In the above-described embodiment, such an access type is not particularly taken into consideration; however, the handover control may be performed in further consideration of the access type. For example, the target HeNB may transmit the acknowledgement for the handover request, to the source HeNB, in a case of an access type in which the target HeNB permits the access by the UE.

In the above-described embodiment, a case is assumed that the target HeNB and the source HeNB are located within the same house (or company); however, whether or not the target HeNB is in the house (or company) where the source HeNB is located may be considered. For example, the source HeNB may transmit, to the target HeNB, the handover request when the source HeNB and the target HeNB are in the same house (or company). Alternatively, the target HeNB may transmit, to the source HeNB, the acknowledgement for the handover request, when the target HeNB and the source HeNB are in the same house (or company).

Figure 6:
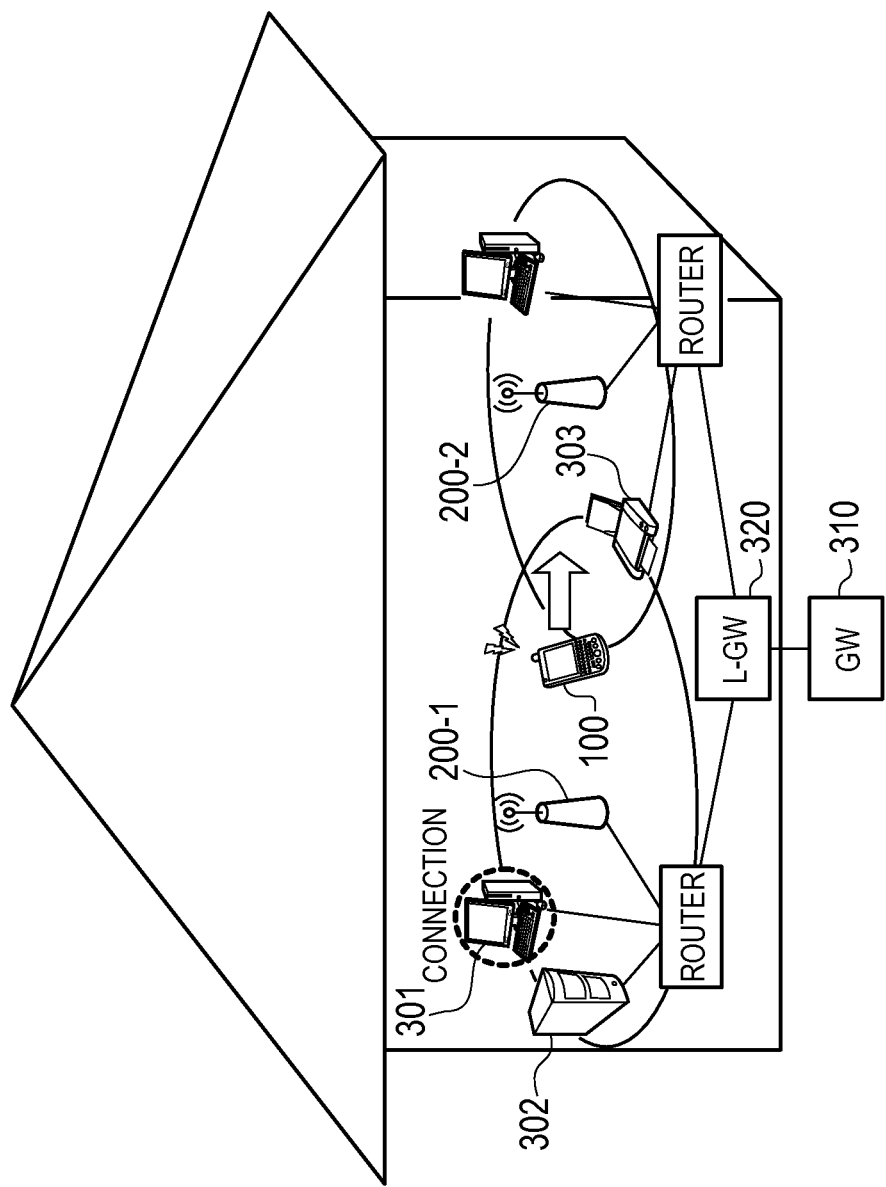
FIG. 6 is a configuration diagram of the mobile communication system according to the other embodiment.

In the above-described embodiment, the configuration that the L-GW function is provided in the HeNB is described; however, it may be configured that the L-GW, which is an external node, is provided independently of the HeNB. For example, as shown in FIG. 6, it may be configured that one L-GW 320 is provided for a plurality of, two, HeNBs 200-1 and 200-2 in a home (or within a company). In such a configuration, the HeNB 200-1 requests the L-GW 320 to release the LIPA connection by using an interface between the HeNB 200-1 and the L-GW 320 rather than using Intra-node Signaling.

As described above, it must be understood that the present invention includes various embodiments or the like that are not described herein.

INDUSTRIAL APPLICABILITY

As described above, a communication control method and a home base station according to the present invention are useful in a mobile communication system, with which it is possible to support a mobility of an LIPA connection.

The invention claimed is:

1. A communication control method in a home base station that supports LIPA (Local Internet Protocol Access) defined in the 3GPP (3rd Generation Partnership Project) standards, comprising:
   a step of transmitting a handover request to a target base station when a handover procedure from the home base station to the target base station is started for a user terminal having a LIPA connection;
   a step of receiving an acknowledgement for the handover request, the acknowledgement being transmitted from the target base station;
   a step of determining whether the acknowledgement from the target base station includes information indicating the LIPA is supported;
   based at least in part on a determination that the acknowledgement from the target base station includes information indicating the LIPA is supported, a step of continuing the handover procedure without releasing the LIPA connection; and
   based at least in part on a determination that the acknowledgement from the target base station does not include information indicating the LIPA is supported, a step of cancelling the handover procedure, wherein
   the home base station transmits the handover request to the target base station without first determining that the target base station supports the LIPA.

2. The communication control method according to claim 1, further comprising, based at least in part on a determination that the acknowledgement from the target base station does not include information indicating the LIPA is supported, releasing the LIPA connection of the user terminal.

3. A home base station that supports LIPA (Local Internet Protocol Access) defined in the 3GPP (3rd Generation Partnership Project) standards, comprising:
   a transmitter configured to transmit a handover request to a target base station when a handover procedure from the home base station to the target base station is started for a user terminal having a LIPA connection;
   a receiver configured to receive an acknowledgement for the handover request, the acknowledgement being transmitted from the target base station; and
   a controller configured to determine whether the acknowledgement from the target base station includes information indicating the LIPA is supported, and, based at least in part on a determination that the acknowledgement from the target base station includes information indicating the LIPA is supported, continue the handover procedure without releasing the LIPA connection, and, based at least in part on a determination that the acknowledgement from the target base station does not include information indicating the LIPA is supported, cancel the handover procedure, wherein
   the home base station transmits the handover request to the target base station without first determining that the target base station supports the LIPA.

4. The home base station according to claim 3, wherein the controller is further configured to, based at least in part on a determination that the acknowledgement from the target base station does not include information indicating the LIPA is supported, release the LIPA connection of the user terminal.

5. A communication control method in a home base station, comprising:
   a step of receiving a handover request transmitted from another home base station that supports LIPA (Local Internet Protocol Access) defined in the 3GPP (3rd Generation Partnership Project) standards for handover of a user terminal;
   a step of determining whether the user terminal is a specified user terminal for which the home base station permits an access, based on the handover request;
   based at least in part on a determination that the user terminal is the specified user terminal, a step of transmitting information indicating whether or not the LIPA is supported by the home base station, to the another home base station, by including the information in an acknowledgement for the handover request;
   a step of transmitting another handover request to a target base station when a handover procedure from the home base station to the target base station is started for another user terminal having a LIPA connection;
   a step of receiving another acknowledgement for the another handover request, the another acknowledgement being transmitted from the target base station;
   a step of determining whether the another acknowledgement from the target base station includes information indicating the LIPA is supported;
   based at least in part on a determination that the another acknowledgement from the target base station includes information indicating the LIPA is supported, a step of continuing the handover procedure without releasing the LIPA connection; and
   based at least in part on a determination that the another acknowledgement from the target base station does not include information indicating the LIPA is supported, a step of cancelling the handover procedure, wherein
the home base station transmits the another handover request to the target base station without first determining that the target base station supports the LIPA.

6. A home base station comprising:
a receiver configured to receive a handover request transmitted from another home base station that supports LIPA (Local Internet Protocol Access) defined in the 3GPP (3rd Generation Partnership Project) standards for handover of a user terminal;
a controller configured to determine whether the user terminal is a specified user terminal for which the home base station permits an access, based on the handover request;
a transmitter configured to, based at least in part on a determination that the user terminal is the specified user terminal, transmit information indicating whether or not the LIPA is supported by the home base station, to the another home base station, by including the information in an acknowledgement for the handover request, wherein
the transmitter is further configured to transmit another handover request to a target base station when a handover procedure from the home base station to the target base station is started for another user terminal having a LIPA connection,
the receiver is further configured to receive another acknowledgement for the another handover request, the another acknowledgement being transmitted from the target base station,
the controller is further configured to determine whether the another acknowledgement from the target base station includes information indicating the LIPA is supported, and, based at least in part on a determination that the another acknowledgement from the target base station includes information indicating the LIPA is supported, continue the handover procedure without releasing the LIPA connection, and, based at least in part on a determination that the another acknowledgement from the target base station does not include information indicating the LIPA is supported, cancel the handover procedure, and
the home base station transmits the another handover request to the target base station without first determining that the target base station supports the LIPA.

* * * * *